United States Patent [19]
Lee

[11] Patent Number: 4,660,135
[45] Date of Patent: Apr. 21, 1987

[54] POWER SUPPLY CIRCUIT OF A TELEVISION RECEIVER USED IN A AUTOMOBILE

[75] Inventor: Yoon K. Lee, Koomi, Rep. of Korea

[73] Assignee: Gold Star Co., Ltd., Seoul, Rep. of Korea

[21] Appl. No.: 751,885

[22] Filed: Jul. 5, 1985

[30] Foreign Application Priority Data

Jul. 5, 1984 [KR] Rep. of Korea ............... 3870/1984

[51] Int. Cl.$^4$ ........................................... H02M 3/335
[52] U.S. Cl. ........................................ 363/21; 363/97; 323/266; 323/299; 358/190
[58] Field of Search ............... 323/266, 268, 271, 272, 323/284, 299; 363/20–21, 97; 358/190; 315/411; 455/343

[56] References Cited
U.S. PATENT DOCUMENTS 4,079,294 3/1978 Teuling .............................. 363/21 X

FOREIGN PATENT DOCUMENTS 0029947 3/1977 Japan ................................ 323/299

Primary Examiner—Peter S. Wong
Attorney, Agent, or Firm—Birch, Stewart, Kolasch & Birch

[57] ABSTRACT

A power supply circuit for a television receiver used in an automobile having either a 12 volt or 24 volt storage battery. The power supply circuit outputs a constant voltage whether connected from a storage battery of 12 volts or 24 volts thereby effecting stable operation of a TV set. A first constant voltage source is activated by an input of 12 volts and the output therefrom is boosted by a booster voltage circuit. A switch means is activated by an input of 24 volts and functions to disable the first voltage source means. A second voltage source means is activated by an input of 24 volts and outputs a constant voltage directly to a horizontal output circuit.

2 Claims, 1 Drawing Figure

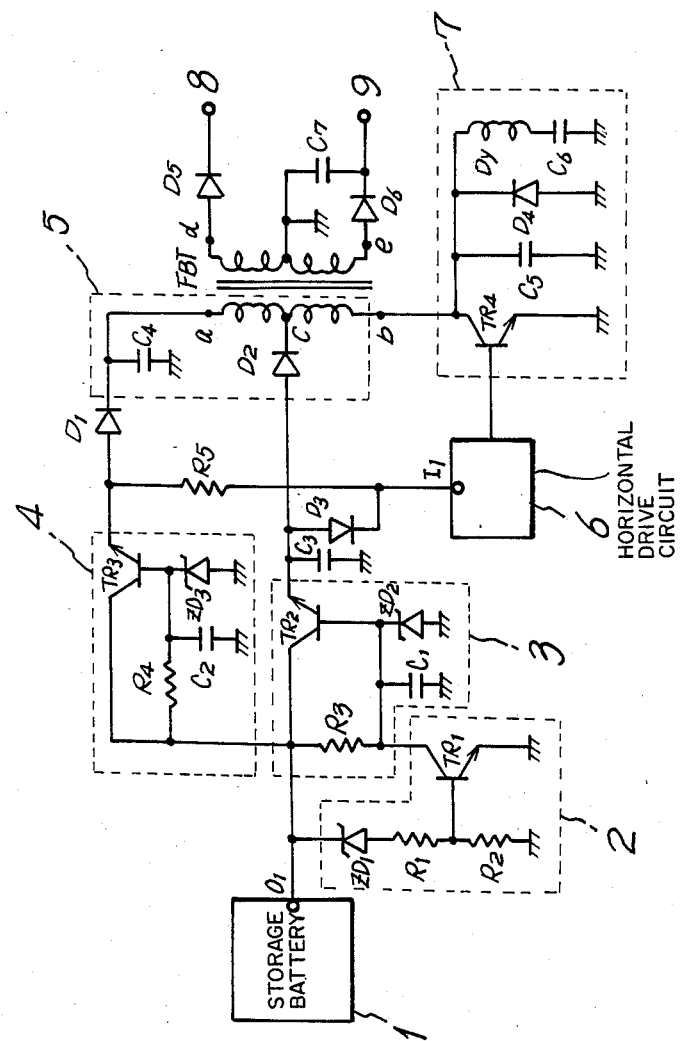

POWER SUPPLY CIRCUIT OF A TELEVISION RECEIVER USED IN A AUTOMOBILE

BACKGROUND OF THE INVENTION

1. Field of the Invention

The present invention relates to a power supply circuit of a television receiver used in an automobile, and in particular to a power supply circuit of a television receiver which enables two different voltages from two kinds of storage batteries for an automobile to be used in common.

2. Description of the Prior Art

Recently, it has become more popular than ever to watch TV in a car as the number of cars increases. In general, a storage battery of 12 volts is used in small cars while one of 24 volts is used in large cars so that there is a disadvantage that a separate power supply device is required for driving a TV set in compliance with the respective battery used in the car.

Accordingly, it is an object of the invention to provide a power supply circuit which outputs a constant voltage whether it is output from the storage battery of 12 volts or from that of 24 volts thereby effecting stable operation of a TV set.

SUMMARY OF THE INVENTION

In accordance with the invention, a power supply circuit of a TV receiver used in a car comprises a switching circuit which switches on a first constant voltage circuit in the case of a 12 volt storage battery and switches on a second constant voltage circuit in the case of a 24 volt storage battery, the output voltage of the said first constant voltage circuit driving a booster circuit simultaneously with the driving of a horizontal drive circuit to have the booster voltage therefrom applied to a horizontal output circuit and the output voltage from the said second constant voltage circuit driving the horizontal drive circuit and at the same time being applied to the horizontal output circuit as it is.

BRIEF DESCRIPTION OF THE DRAWING

The construction, operation and the effect of the invention will be described with reference to the accompanying drawing, wherein:

The sole drawing is a circuit diagram of the power supply circuit according to the invention.

DETAILED DESCRIPTION OF THE INVENTION

Referring to the drawing, the output terminal $O_1$ of a storage battery 1 is connected to the inputs of a switching circuit 2, comprising a Zener diode $ZD_1$, resistors $R_1$ and $R_2$ and a transistor $TR_1$; a first constant voltage circuit 3 comprising a resistor $R_3$, a capacitor $C_1$, a Zener diode $ZD_2$; and a transistor $TR_2$ and of a second constant voltage circuit 4 comprising a resistor $R_4$, a capacitor $C_2$, a Zener diode $ZD_3$, and a transistor $TR_3$, respectively. The collector of transistor $TR_1$ which is the output side of the switching circuit 2 is connectected to the base of transistor $TR_2$ and the emitter of transistor $TR_2$ which is the output side of the first constant voltage circuit 3 is connected via diode $D_2$ to a center tap C of the primary coil of a high voltage transformer FBT. The emitter of transistor $TR_3$ which is the output side of the second constant voltage circuit 4 is connected through diode $D_1$ to a capacitor $C_4$ and to one terminal a of the primary coil of the transformer FBT to constitute the booster circuit 5. The output sides of the first and second constant voltage circuits 3 and 4 are respectively connected through diode $D_3$ and resistor $R_5$ to the horizontal oscillatory power supply terminal $I_1$ of the horizontal drive circuit 6 with the output thereof connected to the base of transistor $TR_4$ of a horizontal output circuit 7, and the other terminal b of the primary coil of the transformer FBT is connected to the collector of transistor $TR_4$ of the horizontal output circuit 7, a capacitor $C_5$, diode $D_4$ and in common to a deflection yoke DY and a capacitor $C_6$ connected in series with each other. Further, one terminal d of the secondary coil of the transformer FBT is connected through diode $D_5$ to the high voltage input terminal 8 source and the other terminal e of the secondary coil is connected through a rectifying circuit formed of a diode $D_6$ and a capacitor $C_7$, to the rectified power input terminal 9.

Assume here that the voltage output from the output terminal $O_1$ of the storage battery 1 is 12 volts (hereinafter called "a first voltage") or 24 volts (hereinafter called "a second voltage"), the Zener voltage from the Zener diodes $ZD_1$ and $ZD_3$ is set lower than the second voltage but higher than the first voltage and the Zener voltage from the Zener diode $ZD_2$ is set lower than the first voltage.

The operation of the power supply circuit of the invention will now be described in detail.

Assume that the output voltage from output terminal $O_1$ of the storage battery 1 is the second voltage. Since Zener voltage of the Zener diode $ZD_1$ is set lower than the second voltage, the Zener diode $ZD_1$, is switched on to apply bias voltage to the transistor $TR_1$ and accordingly the transistor $TR_1$ is turned on with the collector voltage dropping to lower potential so that the transistor $TR_2$ of the constant voltage circuit 3 is turned off with the result that no voltage is output from the emitter of the transistor $TR_2$. However, since the second voltage is applied via resistor $R_4$ of the second constant voltage circuit 4 to Zener diode $ZD_3$ and the Zener voltage from the Zener diode $ZD_3$ is set lower than the second voltage as described above, the Zener diode $ZD_3$ is on and the Zener voltage therefrom is applied to the base of the transistor $TR_3$. Thus the transistor $TR_3$ is on and the emitter thereof outputs a constant voltage. The constant voltage output from the second constant voltage circuit 4 as described above is applied to the horizontal oscillatory power supply terminal $I_1$ through resistor $R_5$, so the horizontal drive circuit 6 performs horizontal oscillation to output an oscillation signal to the transitor $TR_4$ of the horizontal output circuit 7.

The constant voltage output from the second constant voltge circuit 4 is also applied to the terminal a of the primary coil of the transformer FBT via diode $D_1$ and the first constant voltage circuit 3 does not operate, thus no voltage is applied to the center tap C of the primary coil of the transformer FBT so that there is no boosting action of the booster circuit 5.

Accordingly, as only the constant voltage applied to terminal a of the transformer FBT through diode $D_1$ is applied to the horizontal output circuit 7 via the primary coil of the transformer FBT, the transistor $TR_4$ of the horizontal output circuit 7 repeats on and off operations by the oscillatory signal output from the horizontal drive circuit 6 and the horizontal output circuit 7 normally operates.

Assuming that the voltage output from the output terminal $O_1$ of the storage battery 1 is the first voltage, the Zener diodes $ZD_1$ and $ZD_3$ are off to turn off the transistors $TR_1$ and $TR_3$ because the Zener voltages of Zener diodes $ZD_1$ and $ZD_2$ are set higher than the first voltage. Therefore, there is no output voltage from the second constant voltage circuit 4 but since the first voltage output from the output terminal $O_1$ of the storage battery is applied through resistor $R_3$ to the Zener diode $ZD_2$ and the Zener voltage of the Zener diode $ZD_2$ is set lower than the first voltage as described above, the Zener diode $ZD_2$ is on and the Zener voltage thereof is applied to the base of the transistor $TR_2$.

Thus the transistor $TR_2$ is on and the emitter thereof which is the output side of the first constant voltage circuit 3, outputs a constant voltage. As the constant voltage from the circuit 3 is applied to the horizontal oscillatory power supply terminal $I_1$ of the horizontal drive circuit 6 through diode $D_3$, the horizontal drive circuit 6 operates to output a oscillatory signal to the base of the horizontal output circuit 7. Moreover, since the constant voltage output from the first constant voltage circuit 3 is applied to the horizontal output circuit 7 via the coil between the center tap C and the other terminal b of the primary coil of the transformer FBT, the transistor $TR_4$ of the horizontal output circuit 7 repeats on and off operations.

However, when the transistor $TR_4$ of the horizontal output circuit 7 is in the off condition, the output voltage from the first constant voltage circuit 3 applied to the center tap c of the primary coil of the high voltage transformer FBT is charged through the coil between the center tap c of the primary coil and the terminal a of the transformer FBT to the capacitor $C_4$ and thereby operates the booster circuit 5 so that the booster voltage, which is by far higher than the voltage applied to the center tap c of the primary coil of the transformer FBT, is charged to the capacitor $C_4$, and when the transistor $TR_4$ of the horizontal output circuit 7 is in the on condition, the booster voltage charged to the capacitor $C_4$ is discharged through the primary coil of the transformer to the horizontal output circuit 7 to render the transistor $TR_4$ conductive.

Since the booster voltage of the booster circuit 5 is determined by the number of turns of the coil between terminal a and the center tap c of the transformer FBT, the horizontal output circuit 7 operates in the same manner as when the voltage is output from the second constant voltage circuit 4, by adjusting the booster voltage to be the same as that output from the second constant voltage circuit 4 and applied to terminal a of the transformer FBT.

As described above, the voltage induced from the secondary coil of the transformer FBT is constant because the voltage applied across the primary coil of the transformer is constant regardless of the first or the second voltage, thus the voltage induced at one terminal of the secondary coil of the transformer FBT is applied through diode $D_5$ to the high voltage input terminal 8, and the voltage induced at the other terminal e of the secondary coil is rectified by a diode $D_6$ and a capacitor $C_7$ and then applied to the rectified voltage source input terminal 9 in a TV set.

As can be appreciated, in case the output voltage from the storage battery is the first voltage, the first voltage is boosted up to a constant voltage corresponding to the second voltage by the operation of the booster circuit and then applied to the horizontal output circuit through the primary coil of the high voltage transformer, and in case the output voltage from the storage battery is the second voltage, the second voltage which is constant is directly applied to the horizontal output circuit through the primary coil of the transformer without being boosted. Therefore, the horizontal output circuit is stably operative regardless of whether the first or the second voltage is present from the storage battery, and the voltage induced from the secondary coil of the high voltage transformer is also kept constant regardless of the voltage of the battery.

Consequently, the power supply circuit according to the invention makes it possible to drive a TV receiver used in a car stably whether the storage battery of 12 volts or that of 24 volts is used in the car. Moreover, the voltage induced from the secondary coil of the high voltage transformer may be used as a stable power source for other electric apparatus in a car.

What is claimed is:

1. A power supply circuit of a TV receiver in a car using a storage battery of 12 volts or of 24 volts as a power source, comprising:

switching circuit means switched on at 24 volts and switching off a first constant voltage circuit which is turned on at 12 volts to output a first constant voltage;

a second constant voltage circuit turned on at said 24 volts to output a second constant voltage;

a horizontal drive circuit driven by said first and second constant voltage circuits to apply a horizontal oscillatory signal to a horizontal output circuit; and a booster circuit boosting the output voltage from said first constant voltage circuit up to a booster voltage and then applying it to the horizontal output circuit through the primary coil of a high voltage transformer and also applying the output voltage from said second constant voltage circuit to the horizontal output circuit directly through the primary coil of said high voltage transformer, thereby making it possible to use the storage batteries of 12 volts and 24 volts in common.

2. A power supply circuit for a TV receiver in an automobile having a 12 volt or 24 volt DC power source, comprising:

first constant voltage means for outputting a constant voltage of a first magnitude;

second constant voltage means for outputting a constant voltage of a second magnitude higher than said first magnitude;

switching means responsive to a voltage of 24 volts from said DC power source for disabling said first constant voltage means;

said first constant voltage means being directly activated by a voltage of 12 volts from said DC power source;

said second constant voltage means being directly activated by a voltage of 24 volts from said DC power source;

booster circuit means for increasing the voltage outputted by said first constant voltage means including, a primary winding of a high voltage transformer, a center tap on said primary winding connected to said first constant voltage means, capacitor means connected to one end terminal of said primary winding for increasing the voltage of said first constant voltage means;

said second constant voltage means also being connected to said one end terminal of said primary winding;

horizontal output means connected to the other end terminal of said primary winding for supplying AC power to said TV receiver;

horizontal drive means, connected to receive power from said first or said second constant voltage means, for providing an oscillation signal to said horizontal output means;

whereby said TV receiver is operable from either a 12 volt or 24 volt DC power source of said automobile.

* * * * *